United States Patent
Okamoto et al.

(10) Patent No.: US 7,428,708 B2
(45) Date of Patent: Sep. 23, 2008

(54) IMAGE PROCESSING APPARATUS AND STORAGE MEDIUM STORING IMAGE PROCESSING PROGRAM

(75) Inventors: Motoi Okamoto, Kyoto (JP); Eiji Nishikawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 295 days.

(21) Appl. No.: 11/281,396

(22) Filed: Nov. 18, 2005

(65) Prior Publication Data

US 2006/0112353 A1    May 25, 2006

(30) Foreign Application Priority Data

Nov. 19, 2004    (JP)    ............... 2004-335381

(51) Int. Cl.
G06F 3/048 (2006.01)
G06F 3/14 (2006.01)
G06F 3/041 (2006.01)
G06F 3/033 (2006.01)

(52) U.S. Cl. .............. 715/777; 715/702; 715/810; 715/835; 715/840; 715/841; 715/844; 715/864; 345/173; 345/179

(58) Field of Classification Search ............... 715/776, 715/778, 835, 844, 853, 854, 792, 804, 805, 715/810, 821, 823, 777, 840, 841, 831, 767, 715/864, 865, 702, 797; 345/173, 179, 619

See application file for complete search history.

(56) References Cited

U.S. PATENT DOCUMENTS

| | | | | |
|---|---|---|---|---|
| 5,140,678 A | * | 8/1992 | Torres | ............ 715/777 |
| 5,392,387 A | * | 2/1995 | Fitzpatrick et al. | ........ 715/776 |
| 5,404,458 A | * | 4/1995 | Zetts | ................. 710/73 |
| 5,500,929 A | * | 3/1996 | Dickinson | ............ 715/853 |
| 5,714,971 A | * | 2/1998 | Shalit et al. | ............ 715/804 |
| 5,796,383 A | * | 8/1998 | Henshaw et al. | ......... 345/418 |
| 6,097,389 A | * | 8/2000 | Morris et al. | ............ 715/804 |
| 6,842,185 B1 | * | 1/2005 | Mavrommati et al. | ........ 715/844 |
| 7,093,201 B2 | * | 8/2006 | Duarte | ................. 715/853 |
| 7,151,533 B2 | * | 12/2006 | Van Ieperen | ............ 345/173 |
| 7,249,325 B1 | * | 7/2007 | Donaldson | ............ 715/777 |
| 2001/0015721 A1 | * | 8/2001 | Byun et al. | ............ 345/169 |
| 2003/0071849 A1 | * | 4/2003 | Ferri | ................. 345/777 |
| 2004/0004604 A1 | * | 1/2004 | Numano | ............ 345/173 |
| 2005/0050472 A1 | * | 3/2005 | Faseler et al. | ............ 715/734 |
| 2006/0174214 A1 | * | 8/2006 | McKee et al. | ............ 715/802 |

FOREIGN PATENT DOCUMENTS

JP    5-6212    1/1993
JP    11-127399    5/1999

* cited by examiner

*Primary Examiner*—Tadesse Hailu
*Assistant Examiner*—Nicholas S Ulrich
(74) *Attorney, Agent, or Firm*—Nixon & Vanderhye P.C.

(57) ABSTRACT

An image processing apparatus includes a CPU core, and displays a related image according to selection of a main menu icon. For example, in a case that a timer counting for each frame holds a predetermined value, it is determined whether or not the display of the related image has to be switched. If it is determined that the switch is necessary, the display of the related image is switched, and if it is not necessary, the display of the related image is not switched. The time is reset when the selection of the main menu icon and the display of the related image are changed. For example, in a case that selection of the main menu icon continues to be quickly changed, the timer does not reach the predetermined value, so that the related image is never switched.

13 Claims, 10 Drawing Sheets

FIG. 6
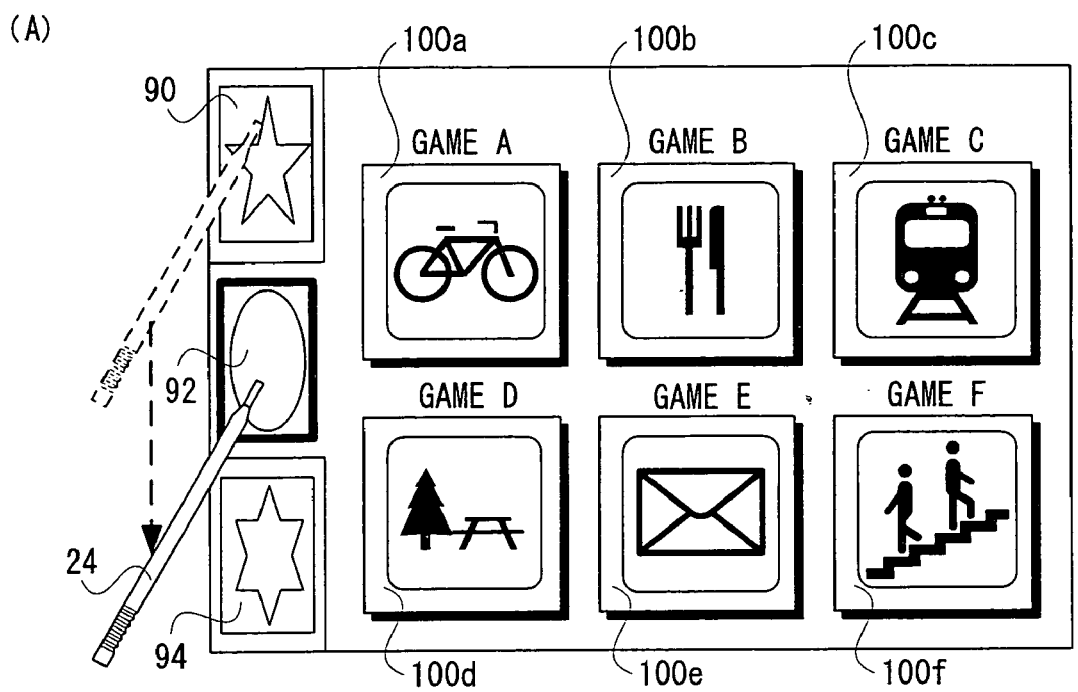
(A)
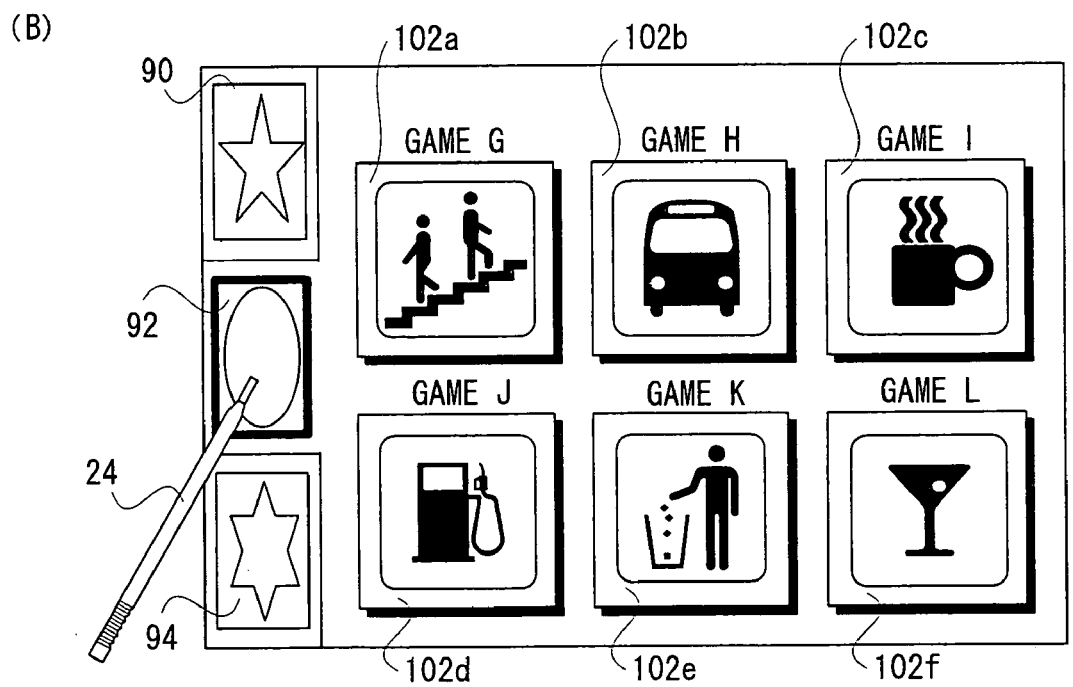
(B)

IMAGE PROCESSING APPARATUS AND STORAGE MEDIUM STORING IMAGE PROCESSING PROGRAM

CROSS REFERENCE TO RELATED APPLICATION

The disclosure of Japanese Patent Application No. 2004-335381 is incorporated herein by reference.

TECHNICAL FIELD

Certain exemplary embodiments relate to an image processing apparatus and a storage medium storing an image processing program. More specifically, certain exemplary embodiments relate to an image processing apparatus and storage medium storing an image processing program that display a related image according to selection of a main menu icon.

BACKGROUND AND SUMMARY

It is well known that when software is in operation in recent personal computers and game machines, etc., by a mouse pointer, a cursor, or the like being moved to an icon such as a specific symbol, character, etc. on the display screen, and by a switch provided on the input device such as a mouse being depressed (clicked), and so forth, the predetermined process corresponding to the selected symbol or character is performed. Such a device provided with the graphical user interface (GUI) is widely adopted without being limited to personal computers and game machines these days.

Recently, in the GUI, touch panels have frequently been used for selecting such the specific symbol, character, etc. The touch panels eliminate a need for moving a cursor and clicking a mouse, and allow a user to perform an operation by selecting the symbols and characters displayed as if he or she directly touches on them.

In addition, in the GUI, when a plurality of menus are displayed, and one item is selected from the plurality of menus according to a movement of the pointer and a touch operation, etc., the GUI sometimes displays an image corresponding to the selected item (submenu, for example). In such the GUI, a user sometimes moves the pointer or moves the finger in a touched state over the plurality of menus when hesitating what to select, and searching for the selection items, and so forth. In this case, the selection item results in being continuously changed to cause a sequential switch of the corresponding images, and therefore, there is a problem of making the menu image flicker and a screen hard to view. In addition, this results in a psychological burden to the user for a menu selection, and discomfort to the operation. In order to avoid this problem, a following technique has been applied.

For example, in the technique described in a reference 1 (Japanese Patent Publication No. 5-6212), in selecting an image such as a numeral, character, etc. by utilizing a touch panel provided and superposed on a display screen, input information can be obtained only once during a continuous input operation to thereby prevent a plurality of pieces of data being input. More specifically, in the technique, a flag indicating that the information input is valid or invalid is provided. The flag is set to invalid after the process of the first input to an effective area is performed. The setting of the flag as invalid is maintained until the finger is released once to cancel the touched state. When there is an input to the effective area, it is determined whether the flag is valid or invalid, and in the invalid case, the information input corresponding to the selection is never performed.

Furthermore, in the technique descried in a reference 2 (Japanese Patent Laying-open No. 11-127399), instability of selection by utilizing a touch panel due to quiver of the finger where icons are selected is prevented. More specifically, in accordance with this technique, a middle area with a predetermined width between the plurality of icons to be selected that does not reflect the change of the selected state is provided. Then, the previous selection is maintained even after the finger is moved to the middle area, and the selection is switched only when the finger moves to the area of another icon.

In the technique of the reference 1, if the touch input is continuously performed, the information input to the effective area is invalidated. Thus, in applying the technique, it is found that the images are never continuously switched responsive to a continuous touch input to the plurality of menus. However, the flag is set to be valid only after the end of the touch input, so that the user cannot perform the next information input without releasing the finger from the touch panel once. Accordingly, in a case of utilizing the touch panel, it is impossible to continuously input by sliding the finger, for example, causing inconvenience of the input operation and a problem in operability.

In addition, in the technique in the reference 2, failure of selecting icons is considered, but in applying the technique, when the finger passes through the non-reactive area, that is, the middle area, a corresponding image is switched and displayed. Accordingly, in performing a continuous touch input to the plurality of menus, a problem such as an image flicker is never solved. Also in the technique of the reference 2, due to the provision of the non-reactive area in addition to the touch-effective area of the icons, a load of the image processing may be increased.

Therefore, it is a feature of certain exemplary embodiments to provide an image processing apparatus and a storage medium storing an image processing program that, when a menu selection is made to display a corresponding image, flicker of an image due to switches of the images is reduced, and operability is improved.

An image processing apparatus according to certain exemplary embodiments is an image processing apparatus for displaying related images responsive to selection of the main menu icons, and comprises a display means, an input means, a storing means, a timer, a switch determining means, and an image switching means. The display means displays a plurality of main menu icons and a related image corresponding to a selected main menu icon. The input means inputs input data indicating a position on a screen of the display means in response to a user operation. The storing means stores at least data relating to the plurality of main menu icons, data relating to a plurality of related images brought into correspondence with the plurality of main menu icons, and an input history of the input means. The timer is reset when the selection of the main menu icon is changed, or when the display of the related image is switched, and is counted up to a predetermined value for each defined time. The switch determining means determines whether or not the display of the related image has to be switched on the basis of the input data from the input means and the data stored in the storing means when the timer holds the predetermined value. The image switching means switches the related image displayed on the display means to the image corresponding to the selected main menu icon when it is determined that the display of the related image has to be switched by the switch determining means.

More specifically, the image processing apparatus (10: a reference numeral corresponding in the embodiments described later, and so forth) is for displaying the related image in response to the selection of the main menu icon. The storing means (28a, 48, 74, 76, 78, 84, 86) stores the data relating to the plurality of main menu icons (90, 92, 94), the data relating to the plurality of related images (submenus) (100, 102), the data (78) indicating the history of the operation state of the touch panel (22) as an input means, and the data indicating the selected main menu icon (identifier of the main menu icon), data indicating a submenu displayed on the menu screen (identifier of submenu icon). The plurality of related images (submenus) are brought into correspondence with the plurality of main menu icons, and in the embodiment, each related image includes the plurality of submenu icons. The display means (14) displays the plurality of main menu icons and the related image corresponding to the selected main menu icon. The input means (22) inputs input data indicating a position on the screen of the display means in response to a user operation. The timer (82) is reset (set to a default value) when the selection of the main menu icon is changed, or when the display of the related image is switched, and counted up to a predetermined value for each defined time. In the embodiment, the timer is counted down for one display frame, and the default value is set to 30, and the predetermined value is set to 0, for example. When the timer holds the predetermined value, that is, when the predetermined time elapses after the change of the selection of the main menu icon, or the display of the related image is switched, the switch determining means (42, S29, S41) determines whether or not the display of the related image has to be switched on the basis of the input data and the data stored in the storing means. In the embodiment, it is determined whether or not the displayed related image and the selected main menu icon do not correspond with each other on the basis of the input data and the data in the storing means, or it is determined whether or not the selection of the main menu icon is changed on the basis of the input data and the data in the storing means. Then, as a result of the determination by the switch determining means, when it is determined that the display of the related image has to be switched, the image switching means (42, S31, S47, 50, 52, 56, 58) switches the related image displayed on the display means to the related image corresponding to the selected main menu icon.

Thus, where the timer holds the predetermined value, it is determined whether or not the display of the related image has to be switched. Then, when it is determined that the switch has to be made, the display of the related image is switched. Accordingly, where the timer holds the predetermined value, and it is determined that the switch has to be made, the related image corresponding to the selected main menu icon is displayed. On the other hand, the timer is reset when the selection of the main menu icon is changed, or when the display of the related image is changed, so that the timer is reset again when the selection of the main menu icon is changed before the predetermined time period elapses from the reset, for example. Accordingly, in a case that the selection of the main menu icon quickly continues to be changed, the timer never reaches the predetermined value, and therefore, the display of the related image is never switched. Consequently, the flicker due to the switch of the related image never occurs. In addition, in a case that the timer reaches the predetermined value, when it is determined that the display of the related image has to be switched, the related image is easily switched without a bothering operation of canceling an input once like the technique in the background of the invention, capable of improving in operability.

In one embodiment, the input means is a touch panel, and the switch determining means determines whether or not the display of the related image has to be switched irrespective of the value of the timer when it is determined that the touch panel is shifted from a no-input state to an input state on the basis of the input data and the data stored in the storing means.

More specifically, the switch determining means (42, S41) determines whether or not the display of the related image has to be switched irrespective of the value of the timer when it is determined that the touch panel is touched from the no-input state (78, S35). When it is determined that the switch has to be made as a result of the switch determining means, the image switching means switches the related image. Accordingly, when the touch panel is touched from the no-input state, the related image can be switched according to the user selection. That is, the user who has determined the selection need not wait for the predetermined time, providing superior operability.

In another embodiment, the switch determining means determines that the display of the related image has to be switched when it is determined that the selection of the main menu icon is changed (S41) or when it is determined that the displayed related image does not correspond to the selected main menu icon (S29), on the basis of the input data and the data stored in the storing means.

Accordingly, in a case that the timer reaches the predetermined value, when the selection of the main menu icon is changed, or when the displayed related image and the selected main menu icon do not correspond with each other, the display of the related image is switched by the image switching means. Thus, an image flicker never occurs, and it is possible to easily display the related image corresponding to the user selection.

In the other embodiment, the switch determining means determines that the display of the related image does not have to be switched when it is determined that the selection of the main menu icon is not changed (S41), or when it is determined that the displayed related image corresponds to the selected main menu icon (S29), on the basis of the input data and the data stored in the storing means.

Accordingly, when the selection of the main menu icon is not changed, or when the displayed related image and the selected main menu icon correspond with each other, even if the timer reaches the predetermined value, the display of the related image is not switched by the image switching means, capable of continuing to display the related image according to the user selection.

A storage medium storing an image processing program according to certain exemplary embodiments is a storage medium storing an image processing program of an image processing apparatus for displaying related images according to the selection of the main menu icons. The image processing apparatus comprises a display means for displaying a plurality of main menu icons and a related image corresponding to a selected main menu icon, an input means for inputting input data indicating a position on a screen of the display means in response to a user operation, a storing means for storing at least data relating to the plurality of main menu icons, data relating to the plurality of related images brought into correspondence with the plurality of main menu icons, and an input history of the input means, and a timer being reset when the selection of the main menu icon is changed, or when the display of the related image is switched, and counted up to a predetermined value for each defined time. The image processing program of the storing medium causes a processor of the image processing apparatus to execute a switch determining step and an image switching step. The switch determining step determines whether or not the display of the related image has to be switched on the basis of the input data from the input means and the data stored in the storing means when the timer holds the predetermined value. The image switching step switches the related image displayed on the display means to the related image corresponding to the selected main menu icon when it is determined that the display of the related image has to be switched by the switch determining step.

Furthermore, it may be a storage medium storing an image processing program corresponding to each of the embodiments of the above-described image processing apparatus.

In these storage medium storing image processing program also, similar to the above-described image processing apparatus, the flicker of the related image never occurs, providing superior operability.

According to certain exemplary embodiments, in a case that the timer holds the predetermined value, necessity of the switch of the related image is determined, and as a result, the related image is switched if necessary. In addition, the timer is reset when the selection of the main menu icon is changed, and so forth, so that where the selection of the main menu icon is continuously switched, the timer does not reach the predetermined value, eliminating the switch of the related image. Accordingly, a screen flicker never occurs to the related image due to the change of the selection of the menu icon. Also, in a case that it is determined the related image has to be switched, the related image can be switched without performing bothering operations, providing superior operability.

In addition, in a case that a necessity of switch of the related image is determined irrespective of the value of the timer when it is determined that the touch panel is touched from the no-input state, for example, the related image can immediately be switched responsive to the decided user selection, providing superior operability.

The above described and other features, aspects and advantages of the present invention will become more apparent from the following detailed description when taken in conjunction with the accompanying drawings.

BRIEF DESCRIPTION OF THE DRAWINGS

FIG. 6 is an illustrative view showing a changing manner of the display screen, FIG. 6 (A) shows the display screen when the touched position is moved from the FIG. 4 state to the main menu icon on the middle line in a touched state, FIG. 6 (B) shows the display screen when the submenu icon is changed, in a case that the touched operation is continued on the main menu icon on the middle line after FIG. 6 (A);

DETAILED DESCRIPTION

Figure 1:
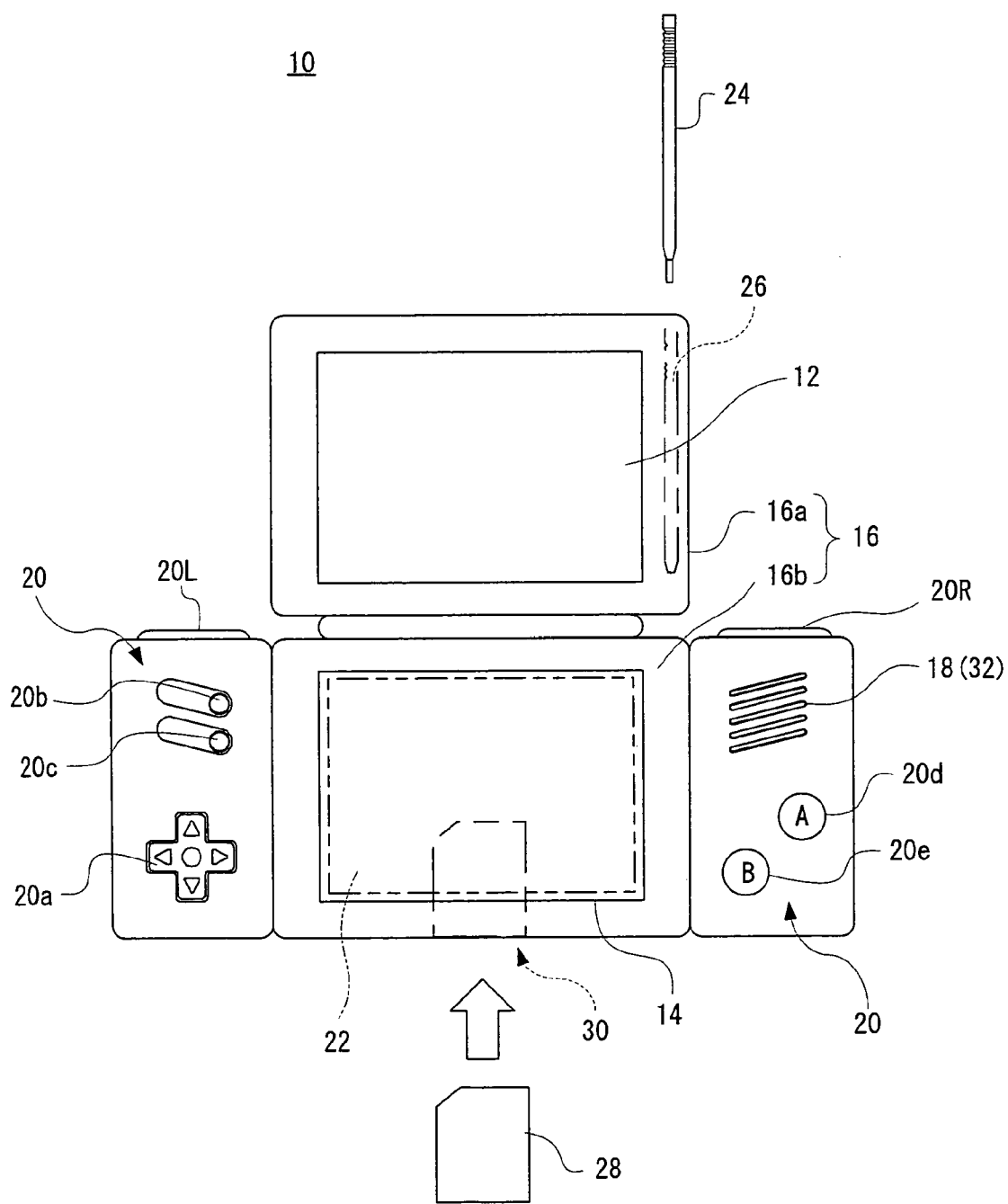
FIG. 1 is an appearance view showing an image processing apparatus of one embodiment.

Referring to FIG. 1, an information processing apparatus 10 of one embodiment is implemented as a form of game apparatus. The game apparatus 10 includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although an LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating at least any one of four depression portions. The start switch 20b is formed by a push button, and is utilized for starting (restarting), temporarily stopping a game, and so forth. The select switch 20c is formed by a push button, and utilized for a game mode selection, etc.

The action switch 20d, that is, the A button is formed by a push button, and allows the player character to perform an arbitrary action, except for instructing the direction, such as hitting (punching), throwing, holding (obtaining), riding, jumping, etc. For example, in action games, it is possible to apply an instruction of jumping, punching, moving arms, etc. In role-playing games (RPG) and simulation RPGs, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch 20L (L button) and the action switch 20R (R button) are formed by a push button, and the L button 20L and the R button 20R functions as the A button 20d and the B button 20e, and also function as a subsidiary of the A button 20d and the B button 20e.

Also, on the top surface of the LCD 14, a touch panel 22 is provided. As the touch panel 22, any one of a resistance film system, an optical system (infrared rays system) and an electrostatic capacitive coupling system, for example, can be utilized. When being operated by depressing, stroking, touching, beating, and so forth with a stick 24, a pen (stylus pen), or a finger (hereinafter, referred to as "stick 24, etc.") on a top surface thereof, the touch panel 22 detects coordinates of the position pointed (being subjected to a touch input) by the stick 24, etc., and outputs coordinates data corresponding to the detected coordinates. Specifically, the touch panel 22 functions as an input means of the touch panel 22 in order to allow the user to input data indicative of a position on the screen of the LCD 14 (LCD12).

It is noted that in this embodiment, a resolution of the display surface of the LCD 14 is 256 dots×192 dots (this is true or roughly true for the LCD 12), and a detection accuracy of a detection surface (operation surface) of the touch panel 22 is also rendered 256 dots×192 dots in correspondence to the resolution of the display surface. It is noted that although the touch panel 22 is shown so as to be different from the LCD 14 in size for the sake of simplicity in FIG. 1, the display screen of the LCD 14 is the same as the operation surface of the touch panel 22 in size. It is noted that detection accuracy of the touch panel 22 may be lower than the resolution of the display surface, or higher than it.

Furthermore, in this embodiment, the stick 24 can be inserted into a housing portion (slot or concave portion) 26 provided in proximity to a side surface (right side surface) of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
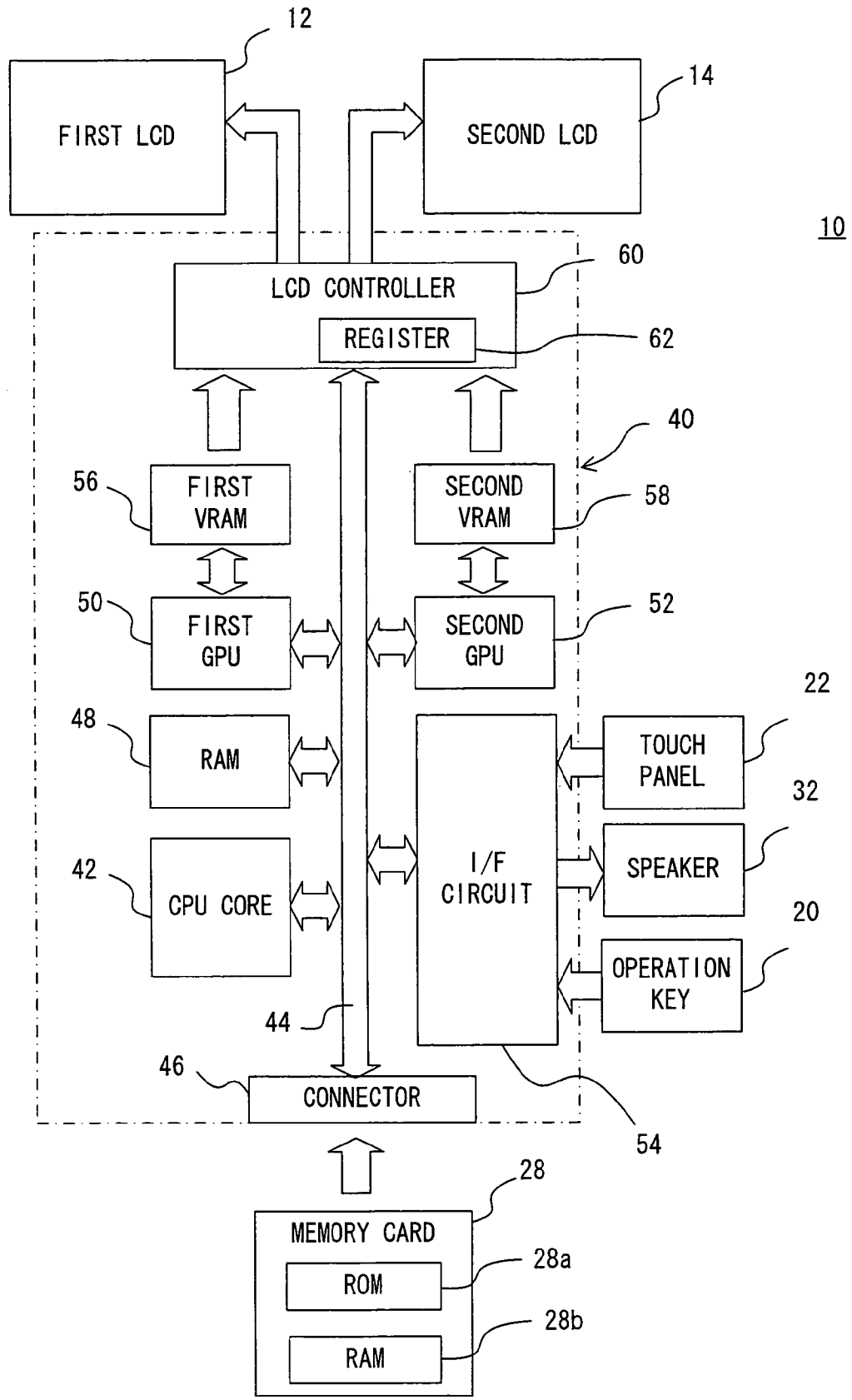
FIG. 2 is a block diagram showing an electric configuration of an image processing apparatus of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance an image processing program for causing the game apparatus 10 to function as an image processing apparatus according to certain exemplary embodiments. In a case a game (virtual game) is executed, the image processing program may be a game program. Furthermore, images (a main menu icon (button) image, a submenu icon image, a character image, a background image, an item image, a message image, etc.) data and data of a necessary sound (music) (sound data), etc. are also stored in advance. The RAM (backup RAM) 28b stores (saves) proceeding data and result data of the image processing or the game.

The RAM 48 is utilized as a buffer memory or a working memory. That is, the CPU core 42 loads the image processing program (game program), the image data, the sound data, etc. stored in the ROM 28a of the memory card 28 into the RAM 48, and executes the loaded image processing program. The CPU core 42 executes the image process (game process) while storing in the RAM 48 data (game data, flag data, etc.) temporarily generated in correspondence with a progress of the game.

It is noted that the image processing program (game program), the image data, the sound data, etc. are loaded from the ROM 28a entirely at a time, or partially as necessary and sequentially so as to be stored (loaded) into the RAM 48.

It is noted that in the ROM28a of the memory card 28, a program as to another application except for the game and the image data necessary for execution of the application may be stored. Additionally, sound (music) data may be stored as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate image data according to the graphics command. It is noted that the CPU core 42 applies to each of the GPU 50 and the GPU 52 an image generating program (included in the image processing program (game program)) required to generate the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 respectively gain access to the first VRAM 56 and the second VRAM 58 to fetch data (image data: main menu icon, submenu icon, character data, texture data, etc.) required to execute the construction command. It is noted that the CPU core 42 reads the image data necessary for rendering from the RAM 48, and writes it to the first VRAM 56 and the second VRAM 58 through the GPU 50 and the GPU 52. The GPU 50 accesses the VRAM 56 to create the image data for display, and the GPU 52 accesses the VRAM 58 to create the image data for display.

The VRAM 56 and the VRAM 58 are connected to the LCD controller 60. The LCD controller 60 includes a register 62, and the register 62 is formed of, for example, one bit, and stores a value of "0" or "1" (data value) according to an instruction of the CPU core 42. The LCD controller 60 outputs the image data created by the GPU 50 to the LCD 12, and outputs the image data rendered by the GPU 52 to the LCD 14 in a case that the data value of the register 62 is "0". On the other hand, the LCD controller 60 outputs the image data created by the GPU 50 to the LCD 14, and outputs the image data rendered by the GPU 52 to the LCD 12 in a case that the data value of the register 62 is "1".

It is noted that the LCD controller 60 can directly read the image data from the VRAM 56 and the VRAM 58, or read the image data from the VRAM 56 and the VRAM 58 via the GPU 50 and the GPU 52.

The I/F circuit 54 is connected with the operating switch (operation key) 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the operation input data (coordinates data) from the touch panel 22 is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs the sound from the speaker 32 via the I/F circuit 54.

Figure 3:
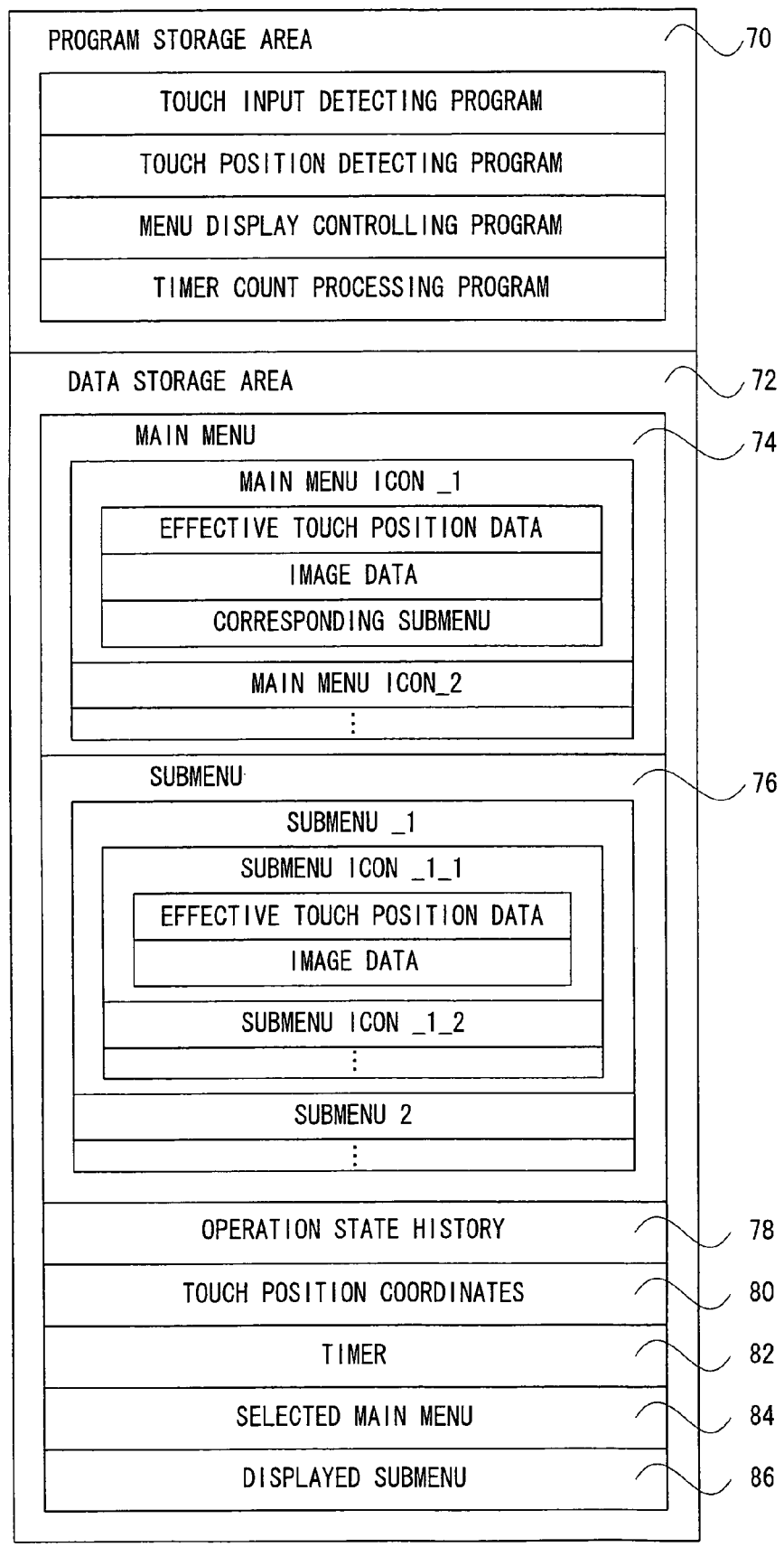
FIG. 3 is an illustrative view showing one example of a memory map in FIG. 1 embodiment.

FIG. 3 shows one example of the memory map of the game apparatus 10. The memory map includes a program storage area 70 and a data storage area 72. It is noted that FIG. 3 shows a part of the program and data to be stored, and the program storage area 70 and the data storage area 72 stores a program and data necessary for an operation of the image processing apparatus 10.

The image processing program (game program) is stored in the program storage area 70 of the ROM 28a. The image processing program in this embodiment includes a touch input detecting program for detecting an input through the touch panel 22, a touch position detecting program for detecting a touched position (coordinates) on the basis of the input data from the touch panel 22, a menu display controlling program for controlling display of menu icons of the menu screen, a timer count processing program, etc.

Furthermore, in the data storage area 72, data of the ROM 28a and data generated or fetched by the CPU core 42 are stored. The data storage area 72 is provided with a main menu area 74, a submenu area 76, an operation state history area 78, a touch position coordinates area 80, a timer 82, a selected main menu area 84, a displayed submenu area 86, etc.

In the main menu area 74, data (main menu icon_1, main menu icon_2, . . . ) relating to a plurality of main menu icons as a selection item are stored. Each main menu icon data is stored in association with an identifier of the main menu icon, for example, and includes effective touch position data indicating a coordinates range of an area where it is confirmed that there is an operation, that is, a selection of the main menu icon, image data indicative of the main menu icon, and data indicative of submenu corresponding to the main menu icon (identifier of the submenu), etc. The image data is image data for indicating a no-selected state to be utilized when no selection is made. In a case that the main menu icon is selected, the image data in the no-selected state is reversed in color or changed in brightness or color, and so forth to generate image data indicative of the selected state. Then, the menu display controlling program displays the image different from the image in the no-selected state. Or, image data indicative of the selected state may be stored in advance in the main menu area 74 so as to be utilized in selection.

In the submenu area 76, data relating to the plurality of submenus (submenu_1, submenu_2, . . . ) are stored. The submenu is a related image brought into correspondence with the main menu icon, and displayed according to the selected main menu icon. In this embodiment, the submenu includes a plurality of submenu icons as a selection item. Each submenu data is stored in association with an identifier of the submenu, and includes data relating to the plurality of submenu icons. Each submenu icon data (submenu icon_1_1, submenu icon_1_2, . . . ) is stored in association with the identifier of the submenu icon, and includes an effective touch position data indicative of a coordinates range of an area where it is confirmed that there is an operation or selection of the submenu icon, image data indicative of the submenu icon, etc. In addition, each submenu icon data may, although omitted in FIG. 3, include data indicative of a program brought into association with the submenu icon (identifier of the program).

Thus, in this embodiment, the submenus are prepared as a selection item relating to the main menu at a lower hierarchy of the plurality of main menus as a selection item. That is, the plurality of selection items are effectively prepared in a hierarchal manner. By selecting a desired main menu icon, the user displays a submenu corresponding to the selected main menu. Then, by selecting a desired submenu icon, it is possible to activate the program corresponding to the submenu icon (game program, for example). Each program (not illustrated) brought into correspondence with each submenu icon is stored in the program storage area 70.

The operation state history area 78 stores data indicative of a history of an operation state (touch state) of the touch panel 22. For example, two data indicative of the operation states of frames at a previous time (closing or directly before) and at this (current) time are stored. It is noted that a frame is a unit of time for updating a display screen (image), and one display frame is 1/60 seconds, for example. The operation state is detected for each frame by the touch input detecting program, and when the touch panel 22 is operated at this frame, the data indicative of an input state to the touch panel is stored while when the touch panel 22 is not operated, the data indicative of a no-input state to the touch panel is stored.

The touch position coordinates area 80 stores coordinates data indicative of a position operated (instructed) by the user. The coordinates data of the touched position is detected by the input data from the touch panel 22 by the touch position detecting program. In the area 80, the coordinates data detected at the previous frame as well as the coordinates data detected at the current frame may be stored.

The timer 82 is a timer for measuring a time elapsed until it is determined whether or not the display of the submenu has to be switched. The determination whether or not switch of the submenu has to be made includes, in this embodiment, a determination whether or not the displayed submenu and the selected main menu icon correspond with each other, and a determination whether or not a main menu icon different from the main menu icon that has been selected at that time is selected in a continuous input state. The timer 82 is counted down for a predetermined time (for each frame) down to a predetermined value (0, for example) in this embodiment. The timer 82 is reset by a timer count program in a case that the timer reaches 0, when the display of the submenu is switched. In addition, in a case that the touch panel is shifted from the input state to the no-input state, or in a case that the timer is 0 during the continuous input state, when selection of the main menu is changed to switch the display of the main menu and the submenu, the timer is also reset. In addition, in a case that the timer is not 0, when the display of the main menu is switched in accordance with the change of selection of the main menu, the timer is also reset. In this embodiment, the default value of the timer 82 is set to 30, for example, and therefore it can be said that when the timer 82 reaches 0, 0.5 seconds elapse. The time to be counted by the timer 82 is set to the values to the extent that the user will not feel too late as to the switch of the display of the submenu.

In the selected main menu area 84, data indicative of the selected main menu icon (identifier of the main menu icon) is stored. The main menu icon selected by the user is detected by verifying touched position coordinates at a current frame and effective touch position data of each main menu icon. In a case that a main menu icon different from the main menu icon selected at a previous frame is selected, the selected main menu data, that is, the selected main menu area 84 is updated. In addition, in this embodiment, the initial menu screen is displayed in such a state that a predetermined main menu icon is selected, and a submenu corresponding to the predetermined main menu is displayed. Accordingly, in the area 84, an identifier indicative of the predetermined main menu icon is stored as a default value.

In the displayed submenu area 86, data (identifier of the submenu) indicative of the submenu displayed on the menu screen is stored. When there is a switch of the display of the submenu, the displayed submenu data are updated. In addition, in this embodiment, the predetermined submenu is displayed on the initial menu screen as described above, and therefore, identifiers indicative of the predetermined submenu is stored as a default value in the area 86.

In this embodiment, first, the initial menu screen is displayed on the LCD 14. The initial menu screen is displayed in advance in such a state that the predetermined main menu icon is selected as described above, and the corresponding submenu icons are also displayed in advance.

Figure 4:
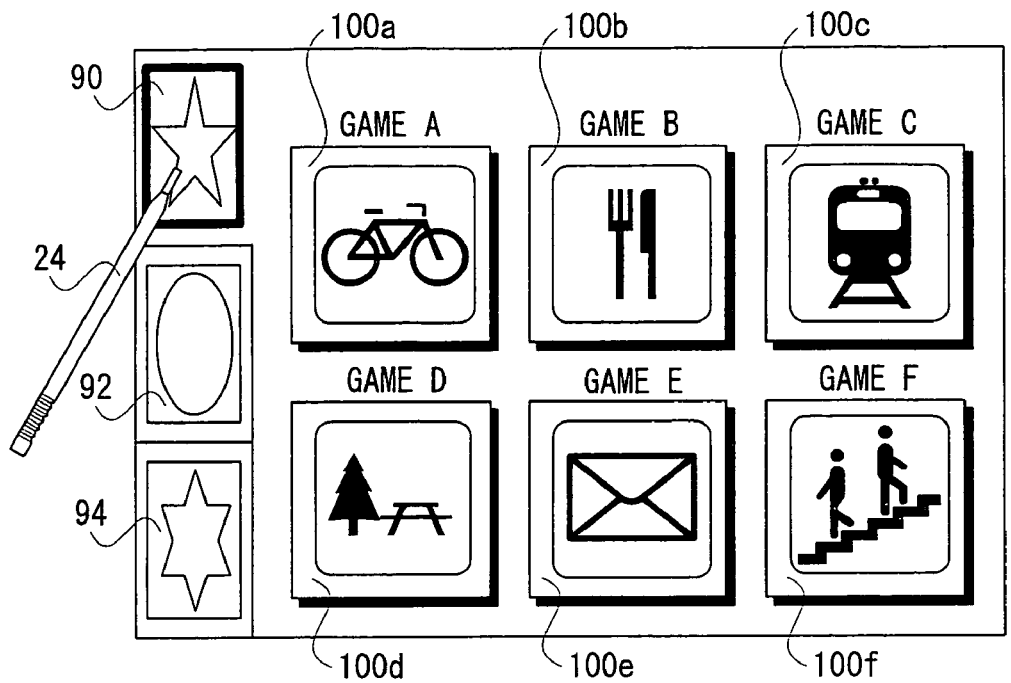
FIG. 4 is an illustrative view showing one example of a display screen.

FIG. 4 shows one example of the menu screen to be displayed on the LCD 14. In this example, an area for displaying the main menu is provided at a left side portion, and an area for displaying the submenu is provided at the right thereof. As a main menu, three main menu icons 90, 92 and 94, for example, are displayed in this order from the top of the screen. FIG. 4 shows a state in which the main menu icon 90 on the upper line is selected by the stick 24, etc. The main menu icon 90 on the upper line is represented by an image indicative of the selected state. In addition, six submenu icons 100a-100f (may inclusively be referred to as "100") are displayed as a submenu corresponding to the selected main menu icon 90. This submenu icons 100a-100f are respectively brought into correspondence with the games A-F. In response to selection of any one of the submenu icons 100, a corresponding game will be executed.

In this embodiment, when a touch operation is first performed on any one of the main menu icons after the initial menu screen is displayed, the display of the selected state of the main menu icons is switched. That is, the main menu icon on which the touch operation is performed is displayed by the image indicative of the selected state, and the main menu icon represented by the image indicative of the selected state at an initial setting is displayed by the image indicative of the no-selected state. In addition, the display of the submenu is immediately switched to the image corresponding to the main menu icon on which the touch operation is performed. For example, when the main menu icon 90 on the upper line is selected on the initial menu screen by the touch operation, the screen shown in FIG. 4 is immediately displayed.

Figure 5:
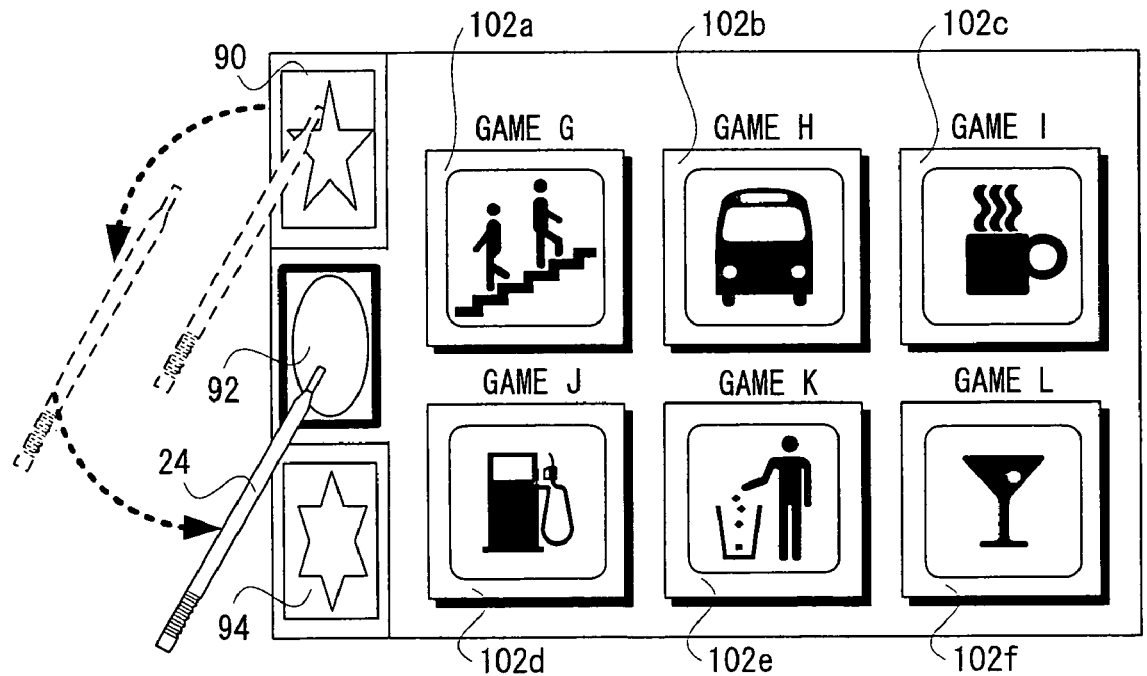
FIG. 5 is an illustrative view showing one example of the display screen when a player releases the touch panel once from a state in FIG. 4, and then touches a main menu icon on a middle line.

FIG. 5 shows one example of the display screen when another main menu icon is touched after the touch panel is released once. More specifically, FIG. 5 shows a state in which the player releases the stick 24, etc. once from the touch panel 22 from the touched state of the main menu icon 90 (FIG. 4), and then performs a touch operation on another main menu icon 92. In this case, similar to the above-described case of the touch operation being first performed, the display of the selected state of the main menu icon is switched from the main menu icon 90 to the main menu icon 92, and the display of the submenus is immediately switched to the image corresponding to the selected main menu icon 92. In the FIG. 5 example, six submenu icons 102a-102f (may inclusively be referred to as "102") respectively brought into correspondence with the games G-L are displayed as a submenu. Thus, in a case that it is determined that the touch panel is shifted from the no-input state to the input state on the basis of the operation state history 78, and a main menu icon different from that at the previous (immediately before) time is touched on the basis of the touch position coordinates 80 and the selected main menu 84, the display of the submenu is immediately switched irrespective of the value of the timer 82.

FIG. 6 shows one example of a shift of the screen in a case that another main menu icon is selected in a state that the touch panel 22 continues to be touched. In FIG. 6 (A), the position of the stick, etc. 24 is moved from the upper line of the main menu icon 90 to the middle line of the main menu icon 92 while the touch operation is continued from the state in FIG. 4. When the selection of the main menu icon is changed in accordance with the movement of the touched position, the display of the selected state of the main menu icon is switched from the main menu icon 90 to the main menu icon 92. Furthermore, when the main menu icon 92 continues to be touched, the display of the submenu is switched from the image (submenu icon 100) corresponding to the main menu icon 90 to the image (submenu icon 102) corresponding to the main menu icon 92 as shown in FIG. 6 (B).

More specifically, in a case that the timer 82 does not reach the predetermined value, it is determined whether or not the same main menu icon as the selected main menu is touched. As a result of the determination, for FIG. 6 (A), it is determined that the same main menu icon is not touched, and therefore, the selected main menu icon is changed to switch the display of the selected state of the main menu icon. Also, the timer 82 is reset. Then, when the main menu icon 92 continues to be touched, and the timer 82 reaches the predetermined value, it is determined whether the display of the submenu and the selected main menu icon 92 do not correspond with each other. As a result, it is determined that there is no correspondence for FIG. 6 (A), and therefore, the display of the submenu is switched so as to be brought into correspondence with the selected main menu icon 92. Thus, when the selection of the main menu icon is changed in a case that the timer 82 does not reach the predetermined value, the display of the submenu is switched after the predetermined time period (30 frames, that is, 0.5 seconds in this embodiment) elapses from the change.

On the other hand, in a case that the main menu icon touched as shown in FIG. 6 (A) is changed at a timing when the timer 82 reaches the predetermined value, the display control of the menu screen is different from the above description. More specifically, when it is determined that the timer 82 reaches a predetermined value, it is determined whether or not the display of the submenu and the selected main menu icon 92 correspond with each other. As a result, it is determined that the display of the submenu and the selected main menu icon do not correspond with each other here, and therefore, the display of the submenu is switched to the image corresponding to the main menu icon 92. Then, the timer 82 is reset. Furthermore, it is determined whether or not the main menu icon the same as the selected main menu is touched. As a result, it is determined that the same main menu icon is not touched here, and therefore, the selected main menu icon is changed to switch the selected state display of the main menu icon to the main menu icon 92. When the selection of the main menu icon is changed at a timing when the timer 82 reaches the predetermined value, the submenu display is immediately switched to the corresponding one.

Or, for example, in a case that the main menu icon 90 continues to be touched and the timer 82 has reached the predetermined value, when the touched main menu icon is changed as shown in FIG. 6 (A) also, the display control of the menu screen becomes different form the above description. More specifically, when the timer 82 reaches the predetermined value during the continuous input state, it is determined whether or not the main menu icon different from the selected main menu is touched. As a result, it is determined that the different main menu icon is touched here, and therefore, the selected main menu icon is changed to switch the selected state display of the main menu icon. In addition, the display of the submenu is also switched to the image corresponding to the selected main menu icon. Thus, when the selection of the main menu icon is changed in a case that the timer 82 has already reached the predetermined value, the display of the submenu is immediately switched to the corresponding one.

Thus, it is possible that the display of the submenu is switched according to the change of the main menu icon in the continuous input state, improving operability. The user can easily switch the submenus without performing a troublesome operation such as releasing the stick 24, etc. from the touch panel 22 and then touching.

Figure 7:
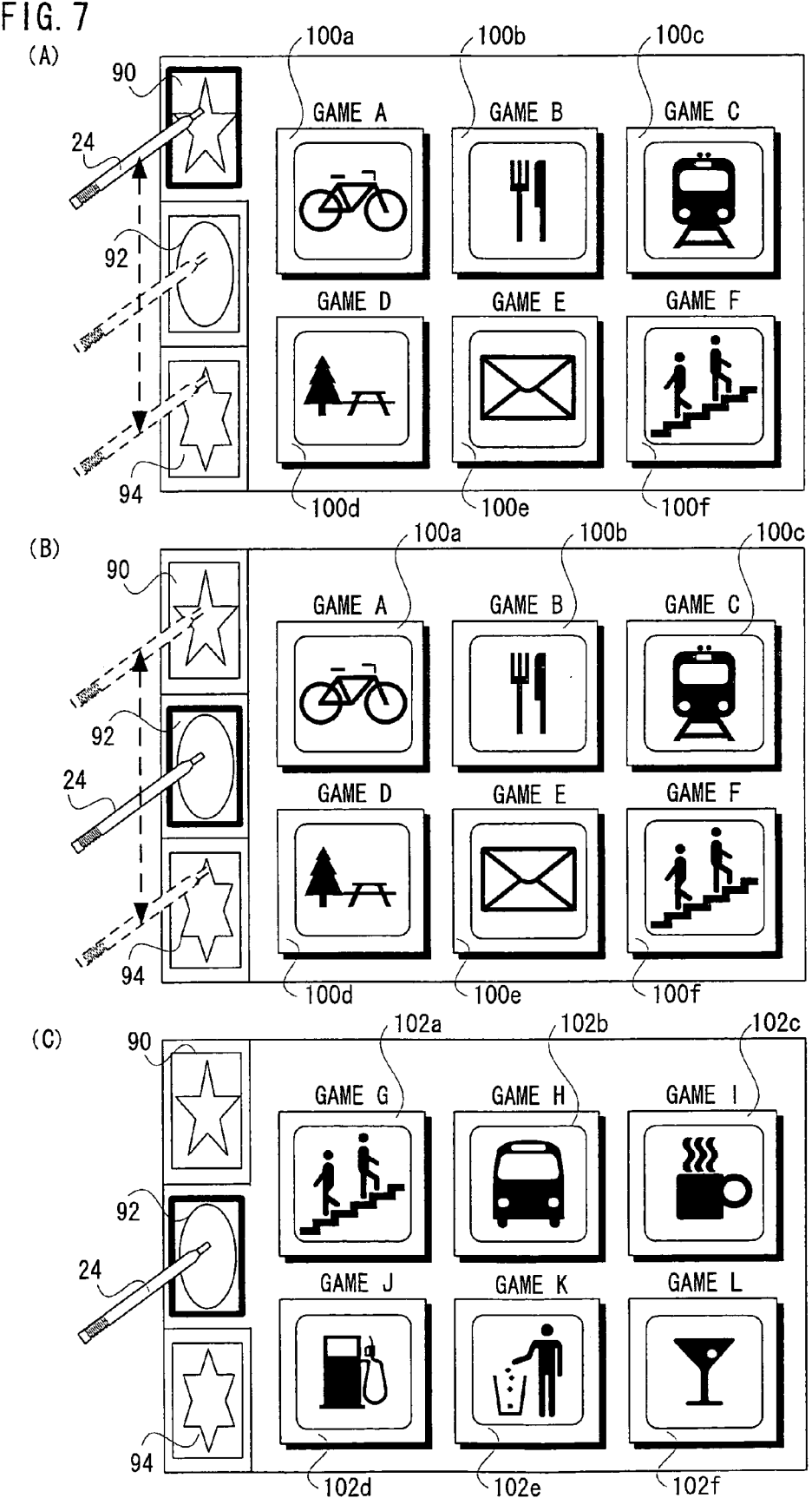
FIG. 7 is an illustrative view showing a changing manner of the display screen, FIG. 7 (A) shows a display screen when the touched position is on the main menu icon on an upper line in a case that the touched position is moved from the FIG. 4 state to the plurality of main menu icons in the touched state, FIG. 7 (B) shows a display screen when the touched position is on the main menu icon on the middle line in a case that the touched position is moved from the FIG. 4 state to the plurality of main menu icons in the touched state, and FIG. 7 (C) shows a display screen when the submenu icon is changed in a case that the touched position stops to move and continues to be on the main menu icon on the middle line.

FIG. 7 shows one example of a shift of the screen where the touched position is moved over the plurality of main menu icons in a touched state. In FIG. 7 (A) and FIG. 7 (B), the touched position is moved over the plurality of main menu icons in the touched state continued from the state in FIG. 4. FIG. 7 (A) shows a screen when the main menu icon 90 on the upper line is touched, and displays the main menu icon 90 by the image indicative of the selected state. Additionally, FIG. 7 (B) shows a screen when the main menu icon 92 on the middle line is touched, and displays the main menu icon 92 by the image indicative of the selected state. Furthermore, in these cases, the image (submenu icons 100a-100f) corresponding to the main menu icon 90 selected in FIG. 4 is displayed as a submenu. Thus, in a case that the touched position is moved over the plurality of main menu icons, the display of the submenu is not switched. It is noted that the selected state display of the main menu icon is switched depending on the change of the selection of the main menu icon. Then, in a case that the movement of the touched position is stopped, and the main menu icon 92 on the middle line is continuously touched, for example, the display of the submenu is switched to the image (submenu icons 102a-102f) corresponding to the main menu icon 92 after the predetermined time elapses from the change to the touch operation of the main menu icon 92 as shown in FIG. 7(C).

More specifically, in a case that the timer 82 does not hold the predetermined value, it is determined whether or not the main menu icon the same as the selected main menu is touched. In this case, the touched position continues to be moved over the plurality of main menu icons, and therefore, it is sure to be determined that the main menu icon the same as the selected main menu is not touched before the timer 82 reaches the predetermined value. Then, the selected main menu icon is changed to switch the display of the selected state of the main menu icon. The timer 82 is then reset. Accordingly, in this case, the timer 82 continues to be reset before it reaches the predetermined value, and it is never determined that the timer 82 reaches the predetermined value. Therefore, in a case that the touched position moves over the plurality of menu icons, the display of the submenu is never switched, eliminating screen flicker due to the switch of display of the submenus.

Figure 8:
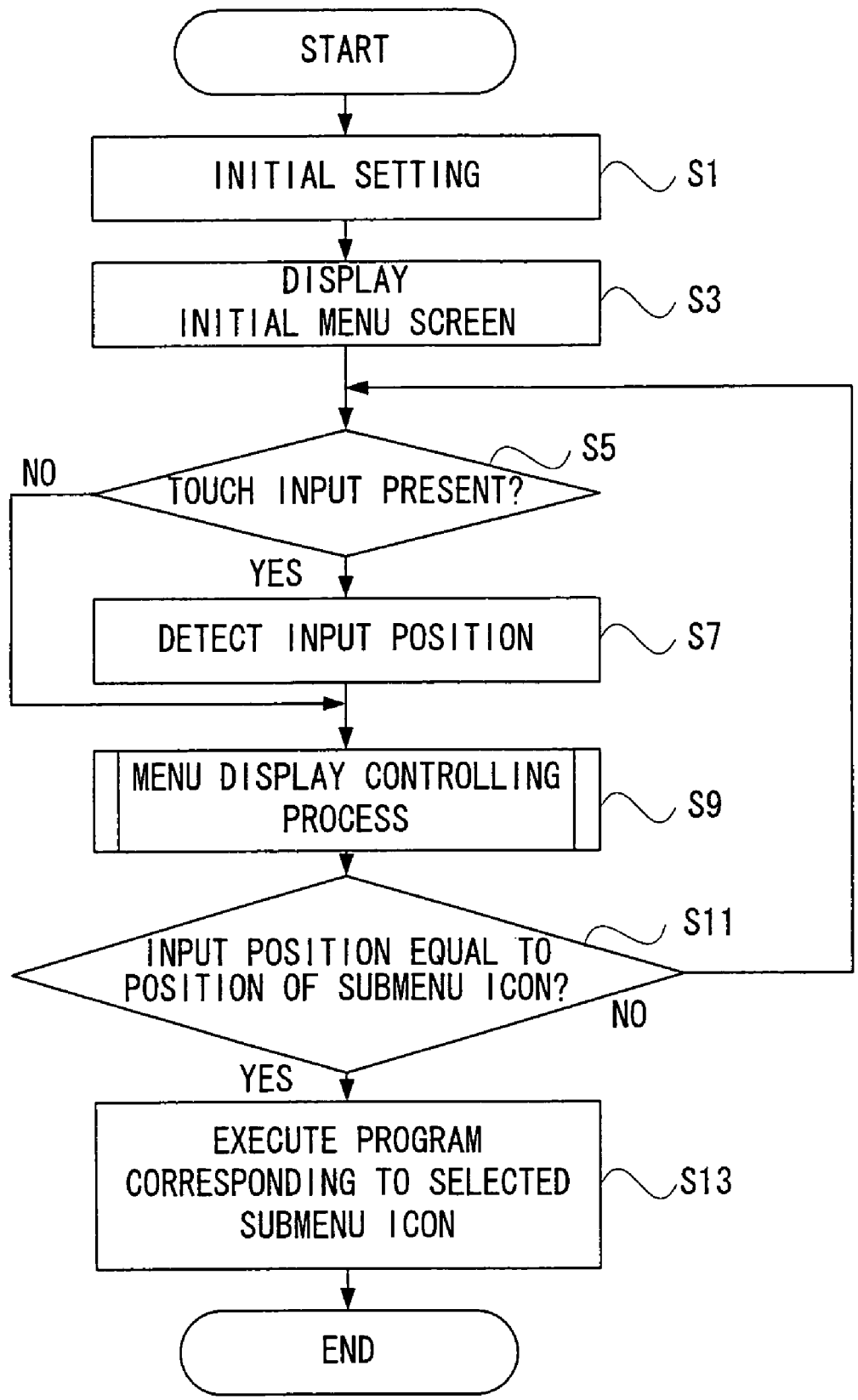
FIG. 8 is a flowchart showing one example of an operation of FIG. 1 embodiment.

FIG. 8 shows one example of an operation of the image processing apparatus 10.

First, in step S1, the CPU core 42 executes an initial setting. More specifically, the touch panel 22 is initialized, default values are set to various flags or variables of the data storage area 72, and so forth. The timer 82 is also reset such that a predetermined value (in this embodiment 30) is set to the variable time, for example.

Next, in step S3, the CPU core 42 displays an initial menu screen. For example, the CPU core 42 stores the image data required to render the initial menu screen in the VRAM 56 or 58 on the basis of the data relating to the initial menu screen read onto the RAM 48. Next, the CPU core 42 applies a graphics command to the GPU 50 or 52 to cause it to render the image data of the initial menu screen on the VRAM 56 or 58. Then, the CPU core 42 applies the image data rendered on the VRAM 56 or 58 to the LCD 14 by utilizing the LCD controller 60, and displays the image, that is, the initial menu screen on the display surface of the LCD 14. Thus, as shown in FIG. 4, the predetermined main menu icon is represented by the image indicative of the selected state, and other main menu icons are represented by the images indicative of no-selected state. Thus, the initial menu screen having the submenu image corresponding to the main menu icon in the selected state is displayed. Additionally, the CPU core 42 stores the identifier indicative of the predetermined main menu icon displayed in the selected state on the initial menu screen in the selected main menu area 84 of the data storage area 72, and stores the identifier indicative of the predetermined submenu displayed on the initial menu screen in the displayed submenu area 86.

The CPU core 42 executes following processes in steps S5 to S11 for each display frame. In step S5, the CPU core 42 determines whether or not there is a touch input. More specifically, the CPU core 42 fetches input data from the touch panel 22 via the I/F circuit 54, and detects the presence or absence of a touch operation on the basis of the fetched input data. If "YES" in step S5, the CPU core 42 detects an input position on the basis of the input data in step S7. That is, the input data includes the coordinates data of the position on which the touch operation is performed, and therefore, the coordinates data is stored in the touch position coordinates area 80. Furthermore, in the operation state history area 78, data indicative of the input state to the touch panel is stored as an operation state at the current frame.

On the other hand, if "NO" in step S5, although omitted in FIG. 8, the CPU core 42 stores data indicative of the no-input state to the touch panel as an operation state at the current frame in the operation state history area 78. Furthermore, in the touch position coordinates area 80, data indicative of absence of the touched position coordinates, for example, is stored. After completion of step S7, or if "NO" in step S5, the process proceeds to step S9.

In step S9, the CPU core 42 executes a menu display controlling process. Through this process, switch of the display of the submenu image on the menu screen, switch of the display of the selected state of the main menu icon, etc. are controlled, and as shown in the above description and in FIG. 4 to FIG. 7, the display of the menu screen is controlled according to the touch operation by the user. The operation of the process is shown in detail in FIG. 9 to FIG. 11, and a description as to them will be made later.

Next, in step S11, the CPU core 42 determines whether or not the input position is equal to the position of a submenu icon. For example, the submenu currently displayed is detected referring to the displayed submenu area 86, and the effective touch position data of the submenu icons included in the submenu is fetched from the submenu area 76. Then, it is determined in which area of the effective touch position data of the submenu icons the touch position coordinates stored in the touch position coordinates area 80 is included.

If "NO" in step S111, that is, if the submenu icon is not touched, the process returns to step S5. On the other hand, if "YES" in step S5, that is, if the submenu icon is selected by the user, the CPU core 42 executes the program corresponding to the selected submenu icon in step S113. This allows the game or application brought into correspondence with the selected submenu icon, for example, to be executed.

Figure 9:
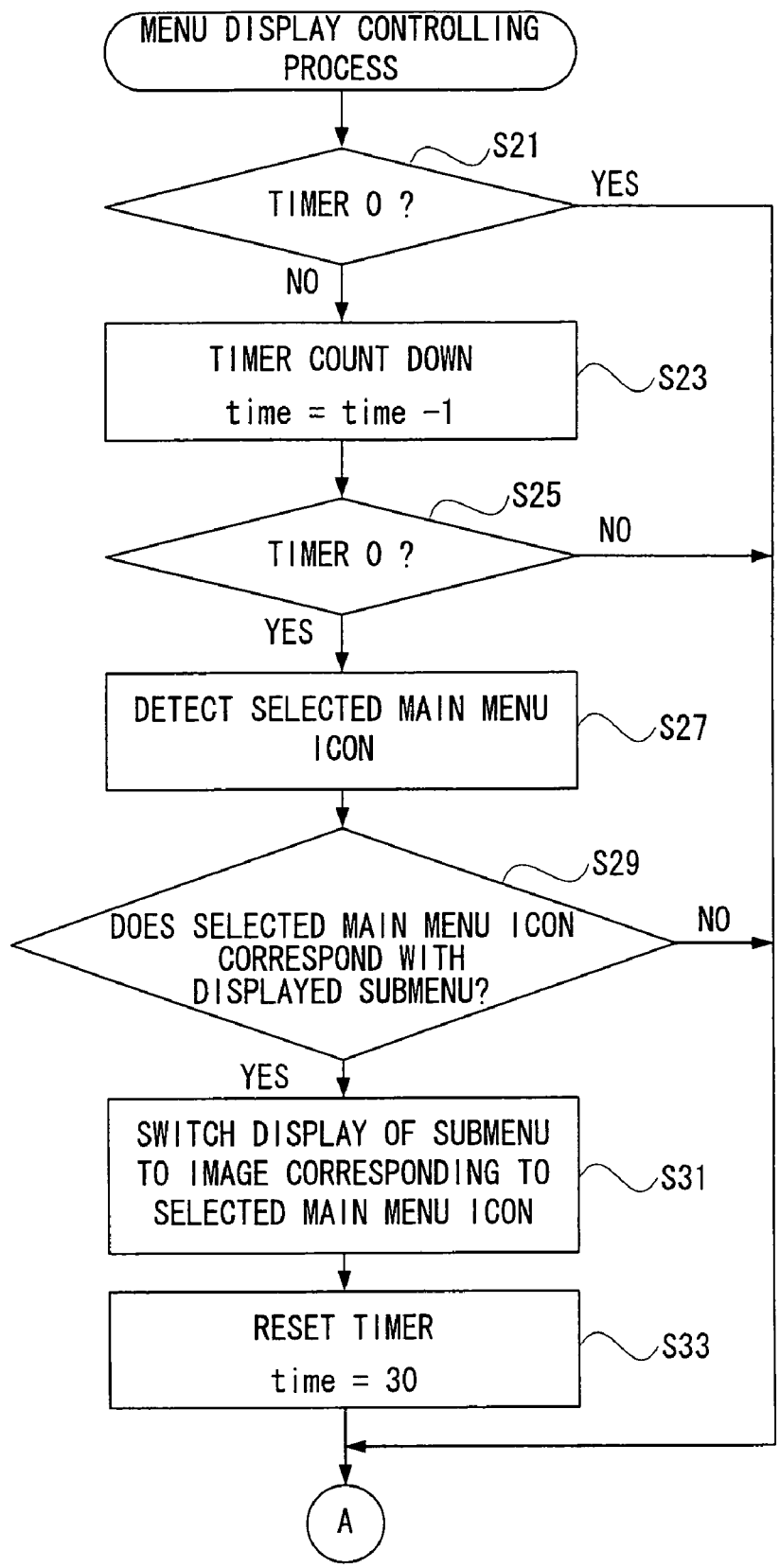
FIG. 9 is a flowchart showing one example of an operation of a menu display controlling process in FIG. 8.
Figure 10:
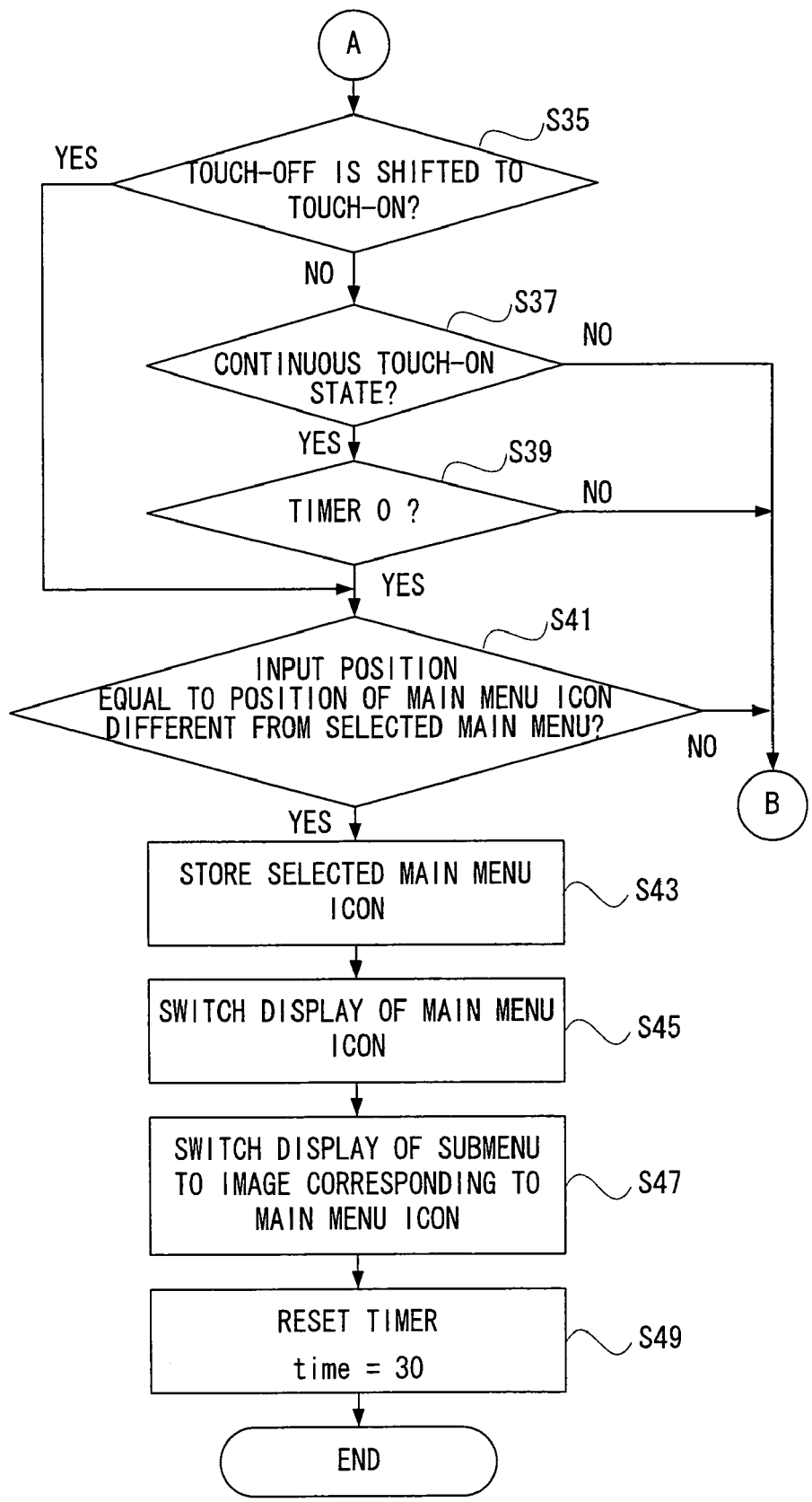
FIG. 10 is a flowchart showing a part continued from FIG. 9.
Figure 11:
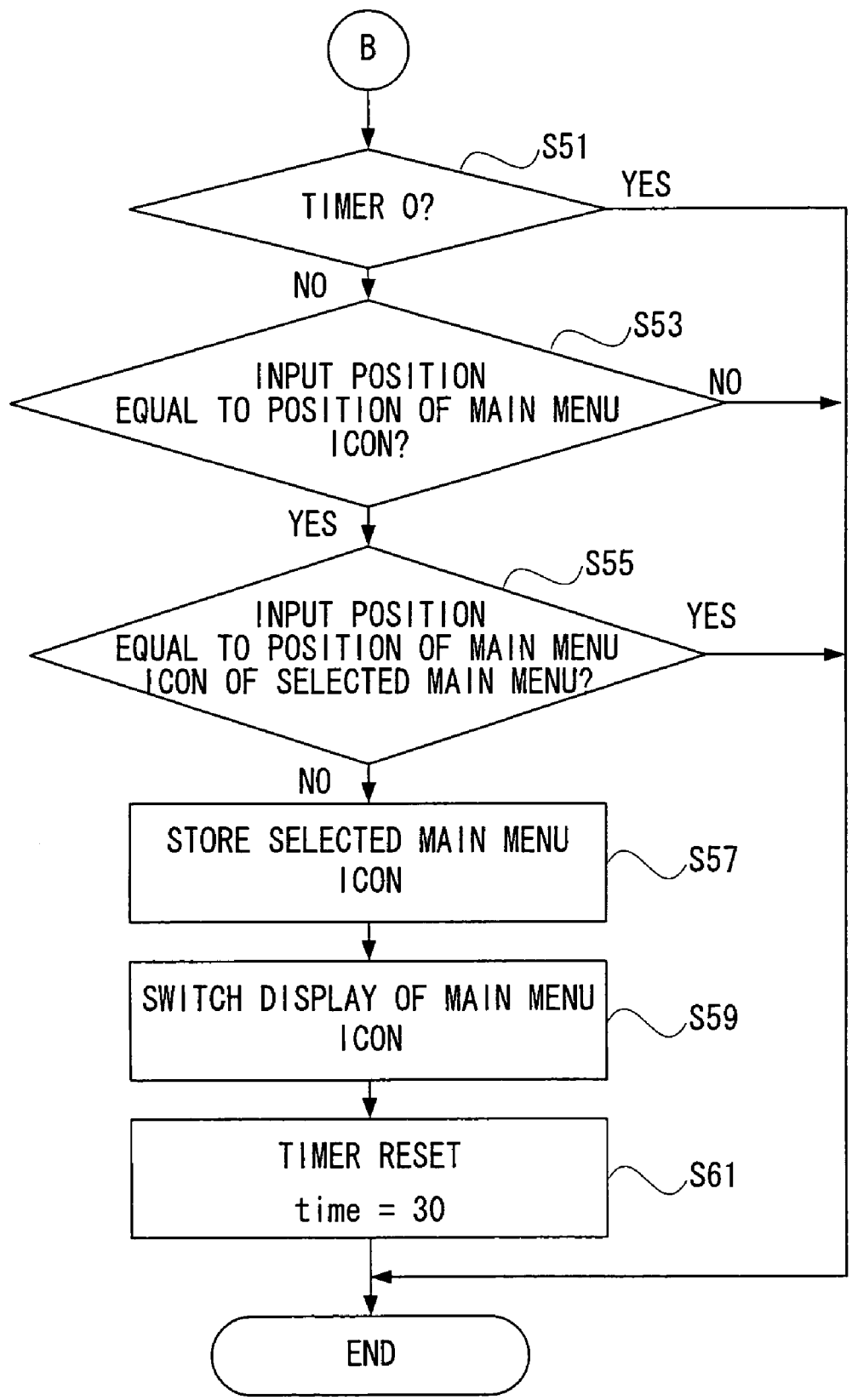
FIG. 11 is a flowchart continued from FIG. 10.

FIG. 9 to FIG. 11 show one example of the menu display controlling process in step S9 shown in FIG. 8. In a first step S21 in FIG. 9, the CPU core 42 determines whether or not the timer 82 reaches a predetermined value (0 in this embodiment). If "YES" in step S21, the process proceeds to step S35 in FIG. 10.

On the other hand, if "NO" in step S21, the CPU core 42 counts down the timer 82 in step S23. That is, the value of the variable time indicating the timer 82 is decremented by 1. Thus, in a case that the timer 82 does not reach 0, the timer 82 is counted down for each frame.

Next, in step S25, the CPU core 42 determines whether or not the timer 82 reaches the predetermined value 0. If "NO" in step S25, that is, if the timer 82 has not yet reached the predetermined value, the process proceeds to step S35 in FIG. 10.

On the other hand, if "YES" in step S25, that is, if the timer 82 reaches the predetermined value 0 at the current frame, it is determined whether or not the display of the submenu has to be switched. That is, the CPU core 42 first detects the selected main menu icon in step S27. More specifically, it is determined in which area of the effective touch position data of the main menu icon stored in the main menu area 74 the coordinates stored in the touch position coordinates area 80 is included to specify the selected main menu icon. It is noted that in a case that there is no touch input, in a case that the main menu icon is not selected, and so forth, no selection is detected.

Then, in step S29, the CPU core 42 determines whether the selected main menu icon and the displayed submenu does not correspond with each other. For example, as to the main menu icon detected in step S27, the data (identifier of the submenu) indicative of the corresponding submenu is fetched from the main menu area 74. Then, it is determined whether or not the fetched data is different from the data stored in the displayed submenu area 86.

If "NO" in step S29, that is, if the display of the submenu and the selected main menu icon correspond with each other, in a case that no selection of the main menu icon is detected, and so forth, the process proceeds to step S35 in FIG. 10.

On the other hand, if "YES" in step S29, that is, if the displayed submenu is not equal to the image corresponding to the selected main menu icon, it is necessary to switch the display of the submenu. Here, the CPU core 42 switches the display of the submenu to the image corresponding to the selected main menu icon in step S31. More specifically, the CPU core 42 fetches from the submenu area 76 the data for rendering the submenu on the basis of the data (identifier of the submenu) indicative of the submenu corresponding to the selected main menu icon, and stores image data of each of the submenu icons out of the fetched data in the VRAM 56 or the VRAM 58. Then, the CPU core 42 applies a graphics command to the GPU 50 or 52 on the basis of the fetched data to cause it to render the image of the submenu corresponding to the selected main menu icon in the VRAM 56 or 58. The rendered submenu image is displayed on the LCD 14 by the LCD controller 60.

Next, in step S33, the CPU core 42 resets the timer 82. In this embodiment, 30 is set to the timer 82 as a default value. After completion of step S33, the process proceeds to step S35 in FIG. 10.

In step S35 in FIG. 10, the CPU core 42 determines whether or not the touch panel is shifted from the no-input state to the input state. That is, it is determined whether or not the data indicative of the no-input state to the touch panel is stored as an operation state at the previous frame, and the data indicative of the input state to the touch panel is stored as an operation state at the current frame, in the operation state history area 78.

If "YES" in step S35, that is, if the touch panel 22 is touched from the no-input state, the process proceeds to step S41 to determine whether or not switch of the display of the submenu and switch of the selected state of the main menu icon have to be made.

If "NO" in step S35, the CPU core 42 determines whether or not in a continuous input state in step S37. That is, it is determined whether or not the data indicative of the input state to the touch panel is stored in the operation state history area 78 as operation states at both previous and current frames.

If "YES" in step S37, that is, if the touch operation is continued, the CPU core 42 determines whether or not the timer 82 holds the predetermined value 0 in a succeeding step S39.

If "YES" in step S39, that is, if the touch operation is continued, and the timer 82 reaches the predetermined value 0, the process proceeds to step S41 to determine the presence or absence of the necessity of switch of the display of the submenu and switch of the display of the selected state of the main menu icon.

In step S41, the CPU core 42 determines whether or not the input position is a position of the main menu icon different from the selected main menu. For example, the CPU core 42 obtains the effective touch position data of each of the main menu icons except for the main menu icon stored in the selected main menu area 84 from the main menu area 74. Then, the CPU core 42 determines in which area of the fetched effective touch position data the coordinates stored in the touch position coordinates area 80 is included.

If "YES" in step S41, that is, if the selection of the main menu icon by the user is changed, it is necessary to switch the display of the submenu and the display of the selected state of the main menu icon. Here, the CPU core 42 detects (specifies) the main menu icon currently selected on the basis of the data in the touch position coordinates area 80 and the effective touch position data in the main menu area 74, and stores the data (identifier of the main menu icon) indicating the selected main menu icon in the selected main menu area 84 in step S43. Thus, when there is a change as to the selection of the main menu icon, the data of the selected main menu area 84 is updated.

Next, in step S45, the CPU core 42 switches the display of the main menu icon. More specifically, the CPU core 42 applies a graphics command to the GPU 50 or 52 to render in the VRAM 56 or VRAM 58 the image data such that the main menu icon that has already been selected at previous time is changed by the image indicative of the no-selected state, and the main menu icon currently selected is changed by the image indicative of the selected state. The rendered image is displayed on the LCD 14 by the LCD controller 60.

In addition, in step S47, the CPU core 42 switches the display of the submenu to the image corresponding to the selected main menu icon similar to the above-described step S31. Then, in step S49, the CPU core 42 resets the timer 82. Thus, the menu display controlling process is ended to return to step S11 in FIG. 8.

On the other hand, if "NO" in step S37, the process proceeds to step S51 in next FIG. 11. If "NO" in step S39, that is, if the touch operation is continued while the timer 82 has not yet reached the predetermined value 0, the process proceeds to step S51 in FIG. 11. In addition, if "NO" in step S41, that is, in a case that the main menu icon the same as the main menu icon that has already been selected at the previous time is touched, in a case that the main menu icon is not touched, and so forth, the process proceeds to step S51 in FIG. 11.

In step S51 in FIG. 11, the CPU core 42 determines whether or not the timer 82 holds the predetermined value 0. If "YES" in step S51, the menu display controlling process is ended to return to step S11 in FIG. 8.

On the other hand, if "NO" in step S51, that is, if the timer 82 has not yet reached the predetermined value 0, it is determined whether or not the switch of the display of the main menu icon has to be made. That is, first, in step S53, the CPU core 42 determines whether or not the input position is equal to the position of the main menu icon. More specifically, it is determined whether or not the coordinates stored in the touch position coordinates area 80 is included in the effective touch position data in the main menu area 74. It is noted that if "NO" in step S53, the menu display controlling process is ended to return to step S11 in FIG. 8.

If "YES" in step S53, the CPU core 42 determines whether or not the input position is a position the same as the position of the main menu icon being equal to the selected main menu in step S55. More specifically, the effective touch position data of the main menu icon is obtained from the main menu area 74 on the basis of the data stored in the selected main menu area 84, and it is determined whether or not the coordinates stored in the touch position coordinates area 80 is included in the obtained effective touch position data.

If "NO" in step S55, that is, if the selection of the main menu icon is changed, the CPU core 42 stores the data indicative of the selected main menu icon in the selected main menu area 84 similar to the above-described step S43 in step S57. Next, in step S59, the CPU core 42 switches the display of the main menu icon similar to the above-described step S45. Then, in step S61, the CPU core 42 resets the timer 82. Thus, the menu display controlling process is ended to return to step S11 in FIG. 8.

Furthermore, if "YES" in step S55, that is, the selection of the main menu icon is not changed, it is not necessary to switch the display of the main menu, and therefore, the menu display controlling process is ended to return to step S11 in FIG. 8.

According to this embodiment, whether or not switch of the display of the submenu has to be made is determined in a case that the timer 82 to be counted down for each frame reaches the predetermined value. Furthermore, in a case that the timer 82 does not reach the predetermined value, when another main menu icon is selected, the timer 82 is reset. Accordingly, in a case that the selection of the main menu icon continues to be changed by moving the touched position over the plurality of main menu icons in a touched state, and so forth, the timer 82 continues to be reset without reaching the predetermined value, and therefore, the image of the submenu is never switched. This eliminates occurrences of flicker due to the switch of the submenu image, thereby improving the viewability of the menu screen. In addition, even if the user hesitates over a menu selection to slide the stick 24, etc. over the plurality of menu icons, the submenu image is not switched one after another, eliminating provision of psychological burden such as forcing the user to make a menu selection and discomfort.

Additionally, in a case that another different main menu icon is selected due to the movement of the touched position in a touched state, it is determined whether or not the switch of the display of the submenu is required after the timer 82 reaches the predetermined value, and whereby the display of the submenu is switched. That is, merely moving the touched position on the desired main menu icon without releasing the stick 24, etc. from the touch panel 22, and then waiting for the predetermined time, the user can easily change the selection of the main menu, and switch the display of the submenu. Accordingly, it is possible to improve operability of the menu selection. Furthermore, there is no need to provide non-reactive area between the main menu icons as described in the background of the invention, and therefore, it is possible to switch the menu images without eliminating a further burden to the image processing.

In addition, in a case that the main menu icon is selected from the no-input state to the touch panel, it is determined whether or not another different main menu icon is selected, that is, whether or not the switch of the display of the submenu and the main menu icon are required irrespective of the value of the timer 82. Accordingly, in a case that the selection of the main menu icon is changed from the no-input state to the touch panel, the display of the submenu and the main menu icon are immediately switched, eliminating a wait of the predetermined time until the submenu being switched in a case that the user has already decided which to select. Therefore, it is possible to realize the improved menu selection operability.

It is noted that in the above-described embodiment, in a case that it is determined that the selected main menu is changed (step S41, step S55), the identifier indicative of the selected main menu icon after change is stored in the selected main menu area 84 to update the data in the selected main menu area 84 (step S43, step S57). However, it may be possible that the selected main menu icon is detected for each frame to update the data of the selected main menu area 84 for each frame.

In addition, in each of the above-described embodiment, in a case that it is determined that the selected main menu is changed, the selected state display of the main menu icon is switched. In this case, the user can easily be informed of the main menu icon currently selected, and it is possible to inform that the image processing apparatus 10 responds to the user operation, and therefore, it is advantageous for the selecting operation by the user. However, in another embodiment, in a case that the selection of the main menu icon is changed, the data of the selected main menu area 84 may only be updated, and the display of the main menu icon may not be switched. Then, the display of the main menu icon may be switched at a timing when the display of the submenu is switched. Thus, the display of the main menu icon is not switched in accordance with the change of the selection of the main menu icon, and therefore, it is possible to eliminate the flicker of the screen due to the switch of the main menu icon.

In addition, the selection of the main menu icon is made on the basis of the touched position, it may be possible that the display of the submenu is switched in accordance with only the touched position without displaying symbols such as an icons, etc. In addition, it is understood that these embodiments are available for the menu display by characters without being limited to the icons.

Also in each of the above-described embodiments, the input means for performing a selection operation of a main menu icon is the touch panel 22. However, the exemplary embodiments can be applied to a case where selection of the main menu icon is made by other pointing devices such as the operating switch 20*a*, a mouse, etc. It is noted that in this case, images of the cursor, mouse pointer, or the like for indicating the input position by the user (pointing position) is displayed on the menu screen. Furthermore, in step S35 in FIG. 10, it is appropriate that whether or not there is an operation by the action switch 20*d*, etc., a click operation, or the like is determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus which displays related images according to selection of main menu icons, comprising:
   a display for displaying a plurality of main menu icons and a related image corresponding to a selected main menu icon,
   an input device for inputting input data indicating a position on a screen of said display in response to a user operation,
   storing locations for storing at least data relating to the plurality of main menu icons, data relating to a plurality of related images brought into correspondence to said plurality of main menu icons, and an input history of said input device,
   a timer being reset when the selection of said main menu icon is changed, or when the display of said related image is switched, and counted up to a predetermined value for each defined time,
   switch determining programmed logic circuitry for determining whether or not the display of the related image has to be switched on the basis of the input data from said input device and the data stored in said storing locations when said timer holds said predetermined value, and
   image switching programmed logic circuitry for switching the related image displayed on said display to the image corresponding to the selected main menu icon when it is determined that the display of the related image has to be switched by said switch determining programmed logic circuitry,
   wherein said image switching programmed logic circuitry does not switch the related image displayed on said display when said timer does not reach said predetermined value.

2. An image processing apparatus according to claim 1, wherein
   said input device is a touch panel, and
   said switch determining programmed logic circuitry determines whether or not the display of the related image has to be switched irrespective of the value of said timer when it is determined that said touch panel is shifted from a no-input state to an input state on the basis of said input data and the data stored in said storing locations.

3. An image processing apparatus according to claim 1, wherein
   said switch determining programmed logic circuitry determines that the display of said related image has to be switched when it is determined that the selection of the main menu icon is changed or when it is determined that the displayed related image does not correspond to the selected main menu icon, on the basis of said input data and the data stored in said storing locations.

4. An image processing apparatus according to claim 1, wherein
   said switch determining programmed logic circuitry determines that the display of said related image does not have to be switched when it is determined that the selection of the main menu icon is not changed or when it is determined that the displayed related image corresponds to the selected main menu icon, on the basis of said input data and the data stored in said storing locations.

5. A storage medium storing an image processing program of an image processing apparatus that displays related images according to selection of main menu icons, comprising a display for displaying a plurality of main menu icons and a related image corresponding to a selected main menu icon, an input device for inputting input data indicating a position on a screen of said display in response to a user operation, a storing locations for storing at least data relating to the plurality of main menu icons, data relating to a plurality of related images brought into correspondence with said plurality of main menu icons, and an input history of said input device, and a timer being reset when the selection of said main menu icon is changed, or when the display of said related image is switched, and counted up to a predetermined value for each defined time, said image processing program causes a processor of said image processing apparatus to execute following steps of:
   determining whether or not the display of the related image has to be switched on the basis of the input data from said input device and the data stored in said storing locations when said timer holds said predetermined value, and
   switching the related image displayed on said display to the related image corresponding to the selected main menu icon when it is determined that the display of the related image has to be switched by said determining step,
   wherein the related image displayed on said display is not switched when said timer does not reach said predetermined value.

6. A storage medium storing an image processing program according to claim 5, wherein
said input device is a touch panel, and
said determining step determines whether or not the display of the related image has to be switched irrespective of the value of said timer when it is determined that said touch panel is shifted from a no-input state to an input state on the basis of said input data and the data stored in said storing locations.

7. A storage medium storing an image processing program according to claim 5, wherein
said determining step determines that the display of said related image has to be switched when it is determined that the selection of the main menu icon is changed or when it is determined that the displayed related image does not correspond to the selected main menu icon, on the basis of said input data and the data stored in said storing locations.

8. A storage medium storing an image processing program according to claim 5, wherein
said determining step determines that the display of said related image does not have to be switched when it is determined that the selection of the main menu icon is not changed or when it is determined that the displayed related image corresponds to the selected main menu icon, on the basis of said input data and the data stored in said storing locations.

9. In an image processing apparatus that displays related images according to selection of main menu icons, a method comprising:
displaying a plurality of main menu icons and a related image corresponding to a selected main menu icon,
receiving input data indicating a position on a screen of said display in response to a user operation,
storing at least data relating to the plurality of main menu icons, data relating to a plurality of related images brought into correspondence to said plurality of main menu icons, and an input history of said input data,
resetting a timer when the selection of said main menu icon is changed, or when the display of said related image is switched;
counting up to a predetermined value for each defined time using the timer,
determining whether or not the display of the related image has to be switched on the basis of the input data and the stored data when said timer holds said predetermined value, and
switching the related image displayed on said display to the image corresponding to the selected main menu icon when it is determined that the display of the related image has to be switched,
wherein the related image displayed on said display is not switched when said timer does not reach said predetermined value.

10. The method according to claim 9, wherein said input data is received via a touch panel, and further comprising determining whether or not the display of the related image has to be switched irrespective of the value of said timer when it is determined that said touch panel is shifted from a no-input state to an input state on the basis of said input data and the stored data.

11. The method according to claim 9, further comprising indicating that the display of said related image has to be switched when it is determined that the selection of the main menu icon is changed or when it is determined that the displayed related image does not correspond to the selected main menu icon, on the basis of said input data and the stored data.

12. The method according to claim 9, further comprising indicating that the display of said related image does not have to be switched when it is determined that the selection of the main menu icon is not changed or when it is determined that the displayed related image corresponds to the selected main menu icon, on the basis of said input data and the stored data.

13. An image processing apparatus which displays related images according to selection of main menu icons, comprising:
a display for displaying a plurality of main menu icons and a related image corresponding to a selected main menu icon,
an input device for inputting input data indicating a position on a screen of said display in response to a user operation,
storing locations for storing at least data relating to the plurality of main menu icons, data relating to a plurality of related images brought into correspondence to said plurality of main menu icons, and an input history of said input device,
a timer being reset when the selection of said main menu icon is changed, or when the display of said related image is switched, and counted up to a predetermined value for each defined time;
switch determining programmed logic circuitry for determining whether or not the display of the related image has to be switched on the basis of the input data from said input device and the data stored in said storing locations when said timer holds said predetermined value, and
image switching programmed logic circuitry for switching the related image displayed on said display to the image corresponding to the selected main menu icon when it is determined that the display of the related image has to be switched by said switch determining programmed logic circuitry,
wherein said input device is a touch panel, and
wherein said switch determining programmed logic circuitry determines whether or not the display of the related image has to be switched irrespective of the value of said timer when it is determined that said touch panel is shifted from a no-input state to an input state on the basis of said input data and the data stored in said storing locations.

* * * * *